(12) United States Patent
Sato et al.

(10) Patent No.: US 8,300,172 B2
(45) Date of Patent: Oct. 30, 2012

(54) WHITE REFLECTIVE FILM

(75) Inventors: Yoshikazu Sato, Shiga (JP); Yoshihiko Sakaguchi, Shiga (JP); Osamu Watanabe, Shiga (JP)

(73) Assignee: Toray Industries, Inc. (JP)

( * ) Notice: Subject to any disclaimer, the term of this patent is extended or adjusted under 35 U.S.C. 154(b) by 652 days.

(21) Appl. No.: 12/527,438

(22) PCT Filed: Apr. 23, 2008

(86) PCT No.: PCT/JP2008/057806
§ 371 (c)(1),
(2), (4) Date: Aug. 17, 2009

(87) PCT Pub. No.: WO2008/139861
PCT Pub. Date: Nov. 20, 2008

(65) Prior Publication Data
US 2010/0033650 A1   Feb. 11, 2010

(30) Foreign Application Priority Data
May 8, 2007   (JP) .................................. 2007-123065

(51) Int. Cl.
*G02F 1/1335* (2006.01)
*G02B 5/08* (2006.01)
(52) U.S. Cl. ............. 349/62; 349/65; 349/113; 359/850
(58) Field of Classification Search .................... 349/62, 349/65, 113; 359/850
See application file for complete search history.

(56) References Cited

U.S. PATENT DOCUMENTS

| | | | |
|---|---|---|---|
| 5,672,409 A | 9/1997 | Miyakawa et al. | |
| 6,771,335 B2 | 8/2004 | Kimura et al. | |
| 6,943,855 B2 | 9/2005 | Nakano | |
| 7,446,462 B2* | 11/2008 | Lim et al. | 313/112 |
| 2002/0001055 A1 | 1/2002 | Kimura et al. | |
| 2004/0052079 A1 | 3/2004 | Nakano | |
| 2004/0066645 A1 | 4/2004 | Graf et al. | |
| 2004/0175562 A1 | 9/2004 | Hayashi et al. | |
| 2010/0034987 A1* | 2/2010 | Fujii et al. | 428/1.1 |
| 2010/0189959 A1* | 7/2010 | Sato et al. | 428/143 |

FOREIGN PATENT DOCUMENTS

| | | |
|---|---|---|
| EP | 1 302 788 | 4/2003 |
| EP | 2 077 458 | 7/2009 |
| JP | 4-239540 A | 8/1992 |
| JP | 8-262208 A | 10/1996 |
| JP | 2001-166295 A | 6/2001 |
| JP | 2001-324608 A | 11/2001 |
| JP | 2002-090515 A | 3/2002 |
| JP | 2002-138150 A | 5/2002 |
| JP | 2002-293898 A | 10/2002 |
| JP | 2002-333510 A | 11/2002 |
| JP | 2004-198722 A | 7/2004 |
| JP | 2004 198743 | 7/2004 |
| JP | 2005-173546 A | 6/2005 |
| JP | 2006-39328 A | 2/2006 |
| JP | 2006-119318 A | 5/2006 |
| JP | 2006-285083 A | 10/2006 |

* cited by examiner

*Primary Examiner* — Mike Qi
(74) *Attorney, Agent, or Firm* — DLA Piper LLP (US)

(57) ABSTRACT

To improve luminance of a backlight, a white reflective film having a coating layer containing spherical particles on at least one side of a white film, in which an absolute value of refractive index difference between the spherical particles and a binder resin forming the coating layer is 0.10 or less, and the spherical particles are nonporous is provided.

8 Claims, 1 Drawing Sheet

WHITE REFLECTIVE FILM

TECHNICAL FIELD

The present invention relates to a white reflective film intended for improving luminance of a liquid crystal backlight, and more specifically to a member preferably used as a reflector of a planar light source in an edge light type and/or direct type backlight for a liquid crystal display.

BACKGROUND ART

A backlight for illuminating a liquid crystal cell is used in a liquid crystal display, and an edge light type backlight is adopted in a liquid crystal monitor and a direct type backlight is adopted in a liquid crystal television respectively depending on kinds of a liquid crystal display. A porous white film formed with air bubbles is generally used as a reflective film for these back-lights (Patent Document 1). In addition, a white film with ultraviolet absorbing layers laminated is proposed for preventing the film from yellowing due to ultraviolet rays radiated from a cold cathode fluorescent lamp (Patent Documents 2 and 3).

Various methods improving the properties of luminance for those reflective films are disclosed in these reflective films. For example, a method of providing a light shielding layer on the film plane opposite to a light source is disclosed for intending an improvement in luminance of an edge light type backlight (Patent Document 4). A method is also disclosed, such that spherical particles are provided on a surface layer having a binder therebetween, and refractive index difference between the spherical particles and the binder is selected, whereby a light diffusivity is controlled to improve a frontal luminance by a light diffuser sheet (Patent Document 5). In addition, a method is disclosed, such that in a reflective sheet of a direct type backlight, luminance unevenness in the backlight is improved by controlling diffusivity of the film plane on the light source side (Patent Document 6).

(Patent Document 1) Japanese Unexamined Patent Publication No. 8-262208
(Patent Document 2) Japanese Unexamined Patent Publication No. 2001-166295
(Patent Document 3) Japanese Unexamined Patent Publication No. 2002-90515
(Patent Document 4) Japanese Unexamined Patent Publication No. 2002-333510
(Patent Document 5) Japanese Unexamined Patent Publication No. 2001-324608
(Patent Document 6) Japanese Unexamined Patent Publication No. 2005-173546

DISCLOSURE OF THE INVENTION

Problems to be Solved by the Invention

In a reflective film for a liquid crystal television which is in remarkable growth, lower costs are strongly demanded while an improvement in reflectance of the reflective film is simultaneously demanded more than conventionally. The reason is that an expensive sheet disposed in the upper part of a light source may be reduced if luminance as the backlight may be improved by an improvement in the reflective properties of the reflective film. As an example of a constitution of a backlight for a liquid crystal television, a diffuser plate (a thickness of approximately 2 mm)/a diffuser film (a thickness of approximately 200 to 300 µm)/a diffuser film (a thickness of approximately 200 to 300 µm)/a diffuser film (a thickness of approximately 200 to 300 µm) are laminated in the upper part of a light source in this order from the light source side. An improvement by 2 to 3% in luminance of the whole backlight allows the diffuser film to be reduced by one sheet in the constitution. However, reflectance of the reflective film depends mostly on a void structure inside a white film, and yet an improvement in reflectance by the contrivance of the void structure is approaching limitations.

The present invention improves reflectance by contriving the surface on the light source side of a white film, unlike the conventional methods. Specifically, the present invention will provide a white reflective film such that a specific coating layer is provided for at least one side of the white film, whereby reflectance is improved to contribute to an improvement in luminance of a backlight.

Means for Solving the Problem

The present invention adopts any of the following means for solving such problems:
(1) a white reflective film having a coating layer containing spherical particles on at least one side of a white film, in which an absolute value of refractive index difference between the spherical particles and a binder resin forming the coating layer is 0.10 or less, and the spherical particles are nonporous;
(2) the white reflective film according to (1), in which a coefficient of variation CV of the spherical particles is 30% or less;
(3) the white reflective film according to (1) or (2), in which the spherical particles contain an ultraviolet absorbing agent and/or a light stabilizer;
(4) the white reflective film according to (3), in which the spherical particles are copolymerized with the ultraviolet absorbing agent and/or the light stabilizer;
(5) the white reflective film according to any one of (1) to (4), in which a resin composing the spherical particles contains the same monomer component as the binder resin forming the coating layer;
(6) the white reflective film according to any one of (1) to (5), in which the white film is composed of three layers, an interlayer is a layer containing air bubbles, at least one of two surface layers is a layer such that inorganic particles and/or organic particles are contained in polyester, and the surface layers containing the inorganic particles and/or the organic particles contain the inorganic particles and/or the organic particles in a range of 0.5% by weight or less with respect to weight of the layers;
(7) an edge light type liquid crystal backlight in which the white reflective film according to any one of (1) to (6) is provided with a coating layer side thereof faced to a light source side; and
(8) a direct type liquid crystal backlight in which the white reflective film according to any one of (1) to (6) is provided with a coating layer side thereof faced to a light source side.

Effect of the Invention

According to the present invention, a white reflective film with a specific coating layer provided for at least one side of a white film may improve reflectance thereby to contribute to an improvement in luminance of a backlight in being used for the backlight.

Figure 1:
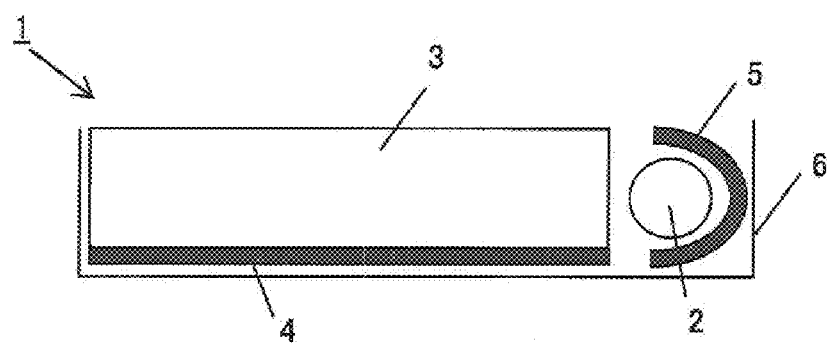
FIG. 1 is a schematic configuration view of an edge light type backlight.

REFERENCE NUMERALS 1 edge light type backlight
2 light source
3 light guide plate
4 reflector
5 lamp reflector
6 housing
10 direct type backlight
12 light source
13 resin plate, film, sheet and the like
14 reflector
16 housing

BEST MODE FOR CARRYING OUT THE INVENTION

With regard to the present invention, earnest studies have been made on the problems, namely, a white reflective film such that a contrivance of a coating layer on a light source side of a white film improves reflectance to contribute to an improvement in luminance of a backlight. As a result, when a coating layer containing spherical particles is coated on at least one side of a white film and specific conditions are made for a relation of refractive index difference between the contained spherical particles and a binder resin forming the coating layer and a pore state of such spherical particles, more effect of improving luminance in being used for the backlight may be confirmed than the case of the white film singly and such problems have been studied to be solved.

The reflectance of the white reflective film depends mostly on a void structure inside a white film as a base material, and yet an improvement in reflectance by the contrivance of the void structure is approaching limitations. Thus, in the present invention, the coating layer containing spherical particles is provided on at least one side of the white film as a base material to improve luminance at the front of a backlight. The reason why luminance of the backlight is improved by making the coating layer containing spherical particles is not clear, but it is conceived that reflection and diffusion are repeated at an interface between a binder resin and spherical particles by containing spherical particles to decrease the refractive index difference between the binder resin and the spherical particles, so that the loss amount of light not propagated to the front is decreased. In the present invention, the spherical particles are determined to be nonporous. The determination of nonporous spherical particles allows the interface at which reflection and diffusion are repeated to be decreased more, and allows a loss amount of light to be decreased to the utmost limit. In addition, a convex portion with a smooth surface is formed on the coating layer surface by the spherical particles, so that it is also assumed that light reflected on the white film surface to transmit through the coating layer is collected without light being lost by the lens effect in the convex portion on the coating layer surface to contribute to an improvement in luminance of the backlight in the front direction.

With regard to the white reflective film of the present invention, an absolute value of refractive index difference between the spherical particles contained in this coating layer and the binder resin forming the coating layer (hereinafter referred to as refractive index difference) needs to be 0.10 or less. As described above, the inclusion of the spherical particles in the coating layer improves the frontal luminance of the backlight, and yet some refractive index difference between the spherical particles and the binder resin causes some of light, which is reflected on the white film surface to transmit through the coating layer, to be diffused at an interface between the spherical particles and the binder resin, so that light which reaches the coating layer surface is decreased. In other words, internal diffusion light loss is increased and reflectance is not improved but deteriorated to the contrary. On the other hand, in the case where refractive index difference is 0.10 or less, internal diffusion light loss in the coating layer is decreased, so that light which reaches the coating layer surface is relatively increased to improve reflectance. In the case where refractive index difference is more than 0.10, even though the white reflective film of the present invention is mounted on the backlight, occasionally the effect of improving luminance is not obtained. The refractive index difference is preferably 0.08 or less, more preferably 0.05 or less, and particularly preferably 0.01 or less.

Here, refractive index means the ratio at which a wave motion traveling straight (such as rays) changes in an angle of the traveling direction at the boundary of a different medium; a value specific to substance on the basis of vacuum, namely, absolute refractive index. Refractive index is a value specific to an observed wavelength and thus refractive index difference is a difference between the values measured at the observed wavelength. For example, the refractive index of polymethyl methacrylate as a typical acrylic resin is 1.49 for light with a wavelength of 589.3 nm.

Refractive index difference is an absolute value of a difference between the refractive index of the spherical particles and the refractive index of the binder resin, and even though the refractive index of the spherical particles is smaller than the refractive index of the binder resin and the refractive index difference is a negative value, an absolute value thereof, namely, a positive value is the refractive index difference.

Here, 'refractive index of spherical particles' and 'refractive index of binder resin' are obtained in the following manner.

(i) The binder resin is extracted from the coating layer by using an organic solvent, which is distilled off, to thereafter measure refractive index for light with a wavelength of 589.3 nm at a temperature of 25° C. by an ellipsometry method. The value obtained is regarded as 'refractive index of binder resin'.

(ii) The coating layer of the white reflective film is immersed in an organic solvent, peeled and taken off from the white film, and thereafter crimped and slid onto a slide glass to thereby drop off the spherical particles from the coating layer. It is confirmed that the outline of the spherical particles obtained disappears by Becke's line detecting method at a temperature of known refractive index of each liquid organic compound, and the refractive index of the liquid organic compound used is regarded as 'refractive index of spherical particles'.

The spherical particles in the present invention need to be nonporous from the viewpoint of an improvement in reflectance and light resistance. If being porous, a refractive interface between the binder resin and the spherical particles is increased, and internal reflected light and diffusion light loss are increased to easily deteriorate reflectance. In the case where light-resisting resin is used as the binder resin of the coating layer, the binder resin goes into the pores if the spherical particles are porous. Thus, even though the binder resin is added by the same amount as the case of using nonporous spherical particles, the film thickness of the coating layer becomes so relatively thin as to deteriorate light resistance.

Here, 'pore' of the spherical particles is obtained in the following manner.

A sample is cut in the direction perpendicular to a film plane at a knife tilt angle of 3° by using a rotary microtome manufactured by Nippon Microtome Laboratory. The obtained film cross section is observed by using a scanning electron microscope ABT-32 manufactured by Topcon Corp. so that one spherical particle is imaged substantially over the whole visual field, for example, by an observation magnification of 2500 to 10000 times or while properly adjusting the contrast of an image, and then the presence of pores is judged.

In the case where the spherical particles may not be cut, the coating layer is immersed in an organic solvent, peeled and taken, and thereafter crimped and slid onto a slide glass to thereby drop off the spherical particles from the coating layer and take a sufficient amount of the spherical particles. Subsequently, the obtained spherical particles are observed by using a scanning electron microscope ABT-32 manufactured by Topcon Corp. so that one spherical particle is imaged substantially over the whole visual field, for example, by an observation magnification of 2500 to 10000 times or while properly adjusting the contrast of an image, and then the presence of pores is judged.

The determination of the presence of pores is performed by whether or not spots or a mottled pattern exist in the particles in the observed image; the case where spots or a mottled pattern exist or not is regarded as the presence of pores or the absence of pores, respectively.

With regard to the spherical particles according to the present invention, a coefficient of variation CV is preferably 30% or less. The coefficient of variation CV is a value such that a standard deviation of a particle diameter is divided by volume average particle diameter. This coefficient of variation CV is measured by a method described in the examples described below, for example. The coefficient of variation CV is more preferably 20% or less, particularly preferably 15% or less, and most preferably 10% or less. In the case where the coefficient of variation CV is more than 30%, the uniformity of the particles is poor and light diffusivity is strengthened to occasionally minimize the effect of improving backlight luminance.

The content of the spherical particles in the coating layer according to the present invention is not particularly limited as long as an improvement in reflectance is obtained, and may not primarily be limited by reason of depending also on kinds of the particles and dispersibility of coating solution; preferably 3% by weight or more, more preferably 5% by weight or more, far more preferably 10% by weight or more, and particularly preferably 15% by weight or more with respect to the whole coating layer. In the case of being less than 3% by weight, occasionally the effect of improving backlight luminance is not obtained. The upper limit is not particularly limited; more than 300 parts by weight with respect to 100 parts by weight of components other than the spherical particles in the coating layer, that is, 75% of the whole coating layer occasionally cause coating properties to be deteriorated, so that 300 parts by weight or less with respect to 100 parts by weight of components other than the spherical particles in the coating layer, that is, 75% or less of the whole coating layer are preferable.

The volume average particle diameter of the spherical particles according to the present invention is not particularly limited as long as a convex shape is formed on the coating layer surface; preferably 0.05 µm or more, more preferably 0.5 µm or more, far more preferably 1 µm or more, and particularly preferably 3 µm or more. In the case of being less than 0.05 µm, occasionally the effect of improving backlight luminance is not obtained. The upper limit is not particularly limited; more than 100 µm occasionally causes coating properties to be deteriorated, so that 100 µm or less is preferable.

Kinds of the spherical particles according to the present invention are not particularly limited, and both organic and inorganic particles may be used. Examples of the organic spherical particles include acrylic resin particles, silicone-based resin particles, nylon-based resin particles, polystyrene-based resin particles, polyethylene-based resin particles, polyamide-based resin particles such as benzoguanamine, and urethane-based resin particles. Examples of the inorganic spherical particles include silicon oxide, aluminum hydroxide, aluminum oxide, zinc oxide, barium sulfate, magnesium silicate, and mixtures thereof. The organic spherical particles are preferably used in view of dispersibility with resin binder generally used, coating properties and economy. Among them, an acrylic polymer, a polystyrene polymer, and a copolymer of an acrylic vinyl monomer and a styrene vinyl monomer are preferable, and particularly the copolymer of an acrylic vinyl monomer and a styrene vinyl monomer may be appropriately used in the present invention for the reason that the adjustment of the copolymerization ratio of two kinds allows the refractive index to be easily changed.

In the present invention, the spherical particles need to be dispersed into a solvent in a step of coating, and so the spherical particles need solvent resistance. Thus, the spherical particles preferably have a crosslinked structure. In the case of not having a crosslinked structure, the spherical particles are eluted in the step of coating, so that the coating layer with particle shape and particle diameter maintained may not be provided.

In order to form the crosslinked structure, a vinyl compound having plural functional groups in one molecule is preferably used to form the crosslinked structure; particularly, in the present invention, examples of the vinyl compound having plural functional groups in one molecule include polyfunctional acrylic compounds such as a bifunctional acrylic compound, a trifunctional acrylic compound and a polymerizable acrylic compound with a tetrafunctionality or more.

In the present invention, "TECHPOLYMER" (manufactured by Sekisui Plastics Co., Ltd.) may be used; above all, S series is preferable for determining the coefficient of variation at 30% or less, and the spherical particles composed of a copolymer of methyl methacrylate and ethylene glycol dimethacrylate, such as SSX series, may be used most appropriately for determining the coefficient of variation at 15% or less.

In the present invention, an ultraviolet absorbing agent and/or a light stabilizer are preferably contained in the spherical particles for improving light resistance. Also, the ultraviolet absorbing agent or the light stabilizer having a reactive double bond are preferably used for decreasing bleed-out from the spherical particles so that copolymerization causes the ultraviolet absorbing agent and the light stabilizer to be fixed.

The ultraviolet absorbing agent and the light stabilizer contained in the spherical particles are divided roughly into inorganic and organic ones.

As an inorganic ultraviolet absorbing agent, titanium dioxide, zinc oxide and cerium oxide are generally known; among them, zinc oxide is most preferable in view of economy, ultraviolet absorbency and photocatalytic activity. Examples of an organic ultraviolet absorbing agent include benzotriazole, benzophenone, oxalic acid anilide, cyanoacrylate, and triazine. These ultraviolet absorbing agents only absorb ultraviolet rays and may not capture an organic radical generated by ultraviolet irradiation, so that this radical occasionally deteriorates a white film as a base material in a chained manner. The light stabilizer is preferably used together for capturing these radicals, and a light stabilizer made of a hindered amine compound is particularly suitably used.

As a copolymerizable monomer for fixing the organic ultraviolet absorbing agent and/or the light stabilizer, vinyl monomers such as acrylic and styrene are high in general-purpose properties and economically preferable. A styrene vinyl monomer is yellowed so easily by reason of having an aromatic ring that the copolymerization with an acrylic vinyl monomer is most preferable in view of light resistance.

Examples of benzotriazole substituted with a reactive vinyl monomer include 2-(2'-hydroxy-5'-methacryloxyethylphenyl)-2H-benzotriazole (trade name: RUVA-93; manufactured by Otsuka Chemical), and examples of a hindered amine compound substituted with a reactive vinyl monomer include 4-methacryloyloxy-2,2,6,6-tetramethylpiperidine ("ADK STAB LA-82"; manufactured by Adeka Corporation).

The spherical particles as described above are provided on at least one side of the white film through the binder resin. Such binder resin are not particularly limited and yet resin composed mainly of an organic component is preferable; examples thereof include polyester-based resin, polyurethane-based resin, acrylic resin, methacrylic resin, polyamide-based resin, polystyrene-based resin, polypropylene-based resin, polyvinyl chloride-based resin, polyvinylidene chloride-based resin, polystyrene-based resin, polyvinyl acetate-based resin, and fluoro-resin. These resins may be used singly, or in a copolymer or a mixture of two kinds or more. Among them, polyester-based resin, polyurethane-based resin, acrylic resin, or methacrylic resin is preferably used in view of heat resistance, particle dispersibility, coating properties and glossiness.

Then, in the present invention, reflectance is improved if refractive index difference between the binder resin and the spherical particles in the coating layer is unlimitedly decreased, and so copolymerization component and monomer composition of the binder resin and the spherical particles are preferably identical. In addition, if both the binder resin and the spherical particles are composed of resin to which the ultraviolet absorbing agent and/or the light stabilizer are added, light resistance of the coating layer is improved. However, the binder resin component preferably does not have the crosslinked structure by reason of needing to be diluted with a solvent in the step of coating. In that sense, the above-mentioned polyfunctional acrylic compounds are not preferably contained in the binder resin component.

In order to prevent the white film as the base material from deteriorating (for example, optical deterioration such as yellowing or decomposition deterioration as lower molecular weight) due to light emitted from a lamp such as a cold cathode fluorescent lamp during using as a backlight, particularly, the ultraviolet absorbing agent and/or the light stabilizer are preferably contained in the binder resin layer provided on one side of the white film.

The binder resin containing the ultraviolet absorbing agent is not particularly limited and yet examples thereof include a resin containing inorganic ultraviolet absorbing agents such as titanium oxide and zinc oxide, a resin containing organic ultraviolet absorbing agents such as benzotriazole and benzophenone, or a resin obtained by copolymerizing benzotriazole-based and benzophenone-based reactive monomers.

Examples of the binder resin containing the light stabilizer include organic ultraviolet absorbing resins including a resin obtained by copolymerizing a hindered amine (HALS)-based reactive monomer.

As an inorganic ultraviolet absorbing agent, zinc oxide, titanium oxide, cerium oxide and zirconium oxide are generally used. Among them, at lest one kind selected from the group consisting of zinc oxide, titanium oxide and cerium oxide hardly bleed-out and is preferably used in view of being excellent in light resistance. Such an ultraviolet absorbing agent may be optionally used together in several kinds. Among them, zinc oxide is most preferable in view of economy, ultraviolet absorbency and photocatalytic activity. FINEX-25LP and FINEX-50LP (manufactured by Sakai Chemical Industry Co., Ltd.) may be used as zinc oxide.

Examples of the organic ultraviolet absorbing agent include a resin containing organic ultraviolet absorbing agents such as benzotriazole and benzophenone or a resin obtained by copolymerizing benzotriazole-based and benzophenone-based reactive monomers, and a resin obtained by copolymerizing a light stabilizer such as a hindered amine (HALS)-based reactive monomer therewith. In particular, organic ultraviolet absorbing resins including the resin obtained by copolymerizing benzotriazole-based and benzophenone-based reactive monomers, and the resin obtained by copolymerizing a hindered amine (HALS)-based reactive monomer therewith are more preferable by reason of thin layer and high ultraviolet absorbing effect.

A producing method therefor is disclosed in detail in [0019] to [0039] of Japanese Unexamined Patent Publication No. 2002-90515, for example. Above all, "HALSHYBRID" (registered trademark) (manufactured by Nippon Shokubai Co., Ltd.) including a copolymer of an acrylic monomer and an ultraviolet absorbing agent as an effective component may be used.

As described above, if the refractive index difference between the binder resin and the spherical particles in the coating layer is unlimitedly decreased, the reflectance is improved and the light resistance of the coating layer is further improved, and so a copolymerization component, a monomer composition, an ultraviolet absorbing agent and a light stabilizer of the binder resin and the spherical particles are preferably identical.

In the present invention, the thickness of the coating layer is not particularly limited; preferably 0.5 to 15 μm, more preferably 1 to 10 μm, and particularly preferably 1 to 5 μm. The coating thickness herein means a thickness of a portion in which only the binder resin is laminated on the white film as a base material (not a thickness of a convex portion by the spherical particles). A thickness of less than 0.5 μm occasionally causes the coating layer lack of light resistance, while a thickness of more than 15 μm is not preferable in view of economy.

The coating thickness is determined in the following manner, for example. First, the white reflective film of the present invention is cut in the direction perpendicular to a film plane at a knife tilt angle of 3° by using a rotary microtome manufactured by Nippon Microtome Laboratory. The obtained film cross section is observed by using a scanning electron microscope ABT-32 manufactured by Topcon Corp. to measure the thickness of the coating layer in five of not the portions in which the spherical particles appear on the coating layer surface but the portions in which the binder resin are on the coating layer surface, and the average value thereof is regarded as the thickness of the coating layer.

In the present invention, the white film as a base material is more favorable if visible ray reflectance is higher, and thus a white film containing air bubbles therein is used. These white films are not limited; for example, a porous un-oriented or biaxial oriented polypropylene film and a porous un-oriented or biaxial oriented polyethylene terephthalate film are preferably used. Producing methods therefor are disclosed in detail in [0034] to [0057] of Japanese Unexamined Patent Publication No. 8-262208, [0007] to [0018] of Japanese Unexamined Patent Publication No. 2002-90515, and [0008] to [0034] of Japanese Unexamined Patent Publication No. 2002-138150. Among them, the porous white biaxial oriented polyethylene terephthalate film disclosed in Japanese Unexamined Patent Publication No. 2002-90515 is particularly preferable as a white film in the present invention for the above-mentioned reason.

In the present invention, the film described below is used most preferably as the following white film for further improving backlight luminance by combination of the white film and the coating layer. That is, a film composed of three layers is preferable, in which an interlayer is a layer containing air bubbles, at least one of two surface layers is a layer in which inorganic particles and/or organic particles are contained in polyester, and the surface layers containing inorganic particles or organic particles contain the inorganic particles or organic particles in a range of 0.5% by weight or less with respect to weight of the layers. The content of the inorganic particles and the organic particles is more preferably 0.1% by weight or less, and particularly preferably 0.07% by weight or less.

More specifically, in the case of a white film composed of three layers of A layer/B layer/A layer in which both surfaces have the same composition, the A layer corresponding to the film surface is preferably a layer such that inorganic particles and/or organic particles are contained in polyester by 0.5% by weight or less with respect to the total weight of each of the A layers.

In the case of a white film composed of three layers of A layer/B layer/C layer in which two surfaces have different compositions, at least one of the A layer and the C layer corresponding to the film surface is preferably a layer in which inorganic particles and/or organic particles are contained in polyester by 0.5% by weight or less with respect to the total weight of each layer (the layer containing inorganic particles and/or organic particles).

In the present invention, the combination of a white film with the added amount of the particles limited and the coating layer further improves backlight luminance. The particle amount in the white film is limited within the range, so that internal diffusion light loss in the white film is decreased and backlight luminance of the white reflective film provided with the coating layer is maximized.

Next, a producing method for the white reflective film is described, but is not limited thereto.

First, a white film is produced. Polymethylpentene as an incompatible polymer and a copolymer of polyethylene glycol, polybutylene terephthalate and polytetramethylene glycol as a density lowering agent are added into polyethylene terephthalate. The resultant is sufficiently mixed and dried, and supplied to an extruder B heated at a temperature of 270 to 300° C. Polyethylene terephthalate containing an inorganic addition agent such as $SiO_2$ is supplied to an extruder A by an ordinary method, if necessary. Then, polymers are positioned in a T-die three-layer mouthpiece so that the polymer in the extruder B is an inner layer (B layer) and the polymer in the extruder A is both surface layers (A layer), and they are melted and formed into a sheet having three layers of A layer/B layer/A layer.

Subsequently, this sheet is stuck, cooled and solidified by electrostatic force on a drum cooled at a drum surface temperature of 10 to 60° C. to obtain an un-oriented film. The un-oriented film is led to a roll group heated at a temperature of 80 to 120° C., longitudinally oriented by 2.0 to 5.0 times in the longer direction, and cooled by a roll group of 20 to 50° C. Subsequently, both ends of the longitudinally oriented film are led to a tenter while being grasped with a clip, and laterally oriented in the direction perpendicular to the longer direction under an atmosphere heated at a temperature of 90 to 140° C. The orientation ratio is 2.5 to 4.5 times in each of the longitudinal direction and the lateral direction, and the area ratio (longitudinal orientation ratio×lateral orientation ratio) is preferably 9 to 16 times. An area ratio of less than 9 times easily causes whiteness of the obtained film to become poor. An area ratio of more than 16 times easily causes break during the orientation and film formability to become poor.

In order to allow the film thus biaxially oriented to have planarity and dimensional stability, the film is heat-fixed at a temperature of 150 to 230° C. in a tenter, gradually cooled uniformly and thereafter cooled to room temperature. Then, the film is wound up by a winder to obtain a white film.

Subsequently, the coating layer containing the spherical particles is provided on at least one side of the white film. First, the spherical particles as described above are mixed with a binder resin, a solvent and optionally various kinds of additives described below, and thereafter dispersed uniformly to obtain a coating solution containing the spherical particles. This coating solution is coated on one side of a white film once or plural times depending on the desired coating layer thickness. In the case of providing the coating layer on both sides, the coating layer is provided on the side opposite to the coated surface by the same method to obtain the white reflective film of the present invention.

When the coating solution containing the spherical particles is coated on the white film as a base material, the coating solution may be coated by an optional method. Methods such as gravure coating, roll coating, spin coating, reverse coating, bar coating, screen coating, blade coating, air-knife coating or dipping may be used.

The coating solution for forming the coating layer may be coated in inline (in-line coating) upon producing the white film as a base material, or coated in offline (off-line coating) on the white film after completing crystalline alignment.

In the present invention, various kinds of additives may be added to the white film and the coating layer to the extent that the effect of the present invention is not impaired. Examples of the additives include organic and/or inorganic particulates, fluorescent whitening agent, crosslinking agent, heat-resistant stabilizer, oxidation-resistant stabilizer, organic lubricant, antistatic agent, nucleating agent, dye, filler, dispersing agent and coupling agent.

With regard to the white reflective film of the present invention thus obtained, average reflectance at a wavelength of 400 to 700 nm measured from the plane provided with the coating layer is preferably 85% or more, more preferably 87% or more, and particularly preferably 90% or more. In the case of an average reflectance of less than 85%, luminance occasionally runs short depending on a liquid crystal display to be applied. In the case where the coating layer is provided for both sides of the white film, average reflectance measured from any of the coating layers may be 85% or more.

Average reflectance is obtained in such a manner that relative reflectance to a standard white plate is measured in a wavelength range of 400 to 700 nm at intervals of 10 nm in a state of mounting a spectrophotometer U-3410 (manufactured by Hitachi, Ltd.) with a ϕ60 integrating sphere 130-

0632 (manufactured by Hitachi, Ltd.) and a 10° C. tilt spacer to calculate the average value thereof. The parts number 210-0740 manufactured by Hitachi Instruments Service Co., Ltd. is used for the standard white plate to calculate the average value of three samples and adopt average reflectance thereof.

With regard to the white reflective film of the present invention thus obtained, luminance of a liquid crystal backlight may be improved; according to a more preferable embodiment, a decrease in reflectance is so small even when used for a long time that the white reflective film may be favorably used as a reflector of a planar light source such as edge light type or direct type backlights for a liquid crystal screen as well as a lamp reflector in an edge light type backlight.

Specifically, as shown in FIG. 1, the edge light type backlight is one in which a light source 2 is placed by one or plurality at any of one end, both ends and four peripheral sides of the backlight to propagate light of the light source 2 through a light guide plate 3 and then illuminate the screen side. As a reflector 4 placed below the light guide plate or as a lamp reflector 5 placed so as to surround the opposite periphery to the light guide plate of the light source 2, the white reflective film of the present invention is used directly depending on the backlight constitution, used in combination with various kinds of metals, alloys and other supports, or used while being bent properly.

Figure 2:
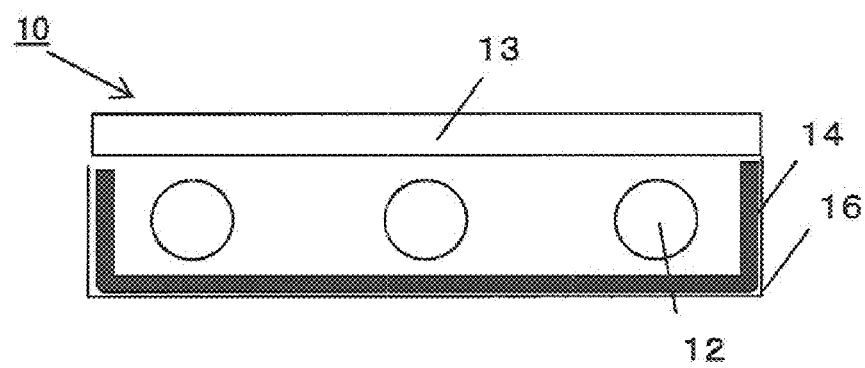
FIG. 2 is a schematic configuration view of a direct type backlight.

As shown in FIG. 2, a direct type backlight 10 is one in which a light source 12 is placed at some intervals in the planar direction in a housing made of various kinds of metals, alloys and other resins, and a resin plate, a film, a sheet and the like 13 having the function of diffusing or concentrating light are placed on the opposite side to the housing 16 across the light source to thereby illuminate the opposite side to the housing 16, namely, the screen side; the white reflective film of the present invention is used as a reflector 14 placed on the housing plane. Thus, light propagated to the housing side may be reflected on the screen side and consequently luminance of the screen may be improved to further brighten the screen.

When being used for these planar light sources, the white reflective film of the present invention is placed as the coating layer thereof face the light source side.

EXAMPLES

Measuring methods and evaluation methods are described below.
(1) Content of Spherical Particles
In the case of being unknown, the content of the spherical particles in the coating layer was calculated in the following manner.
  (i) The coating layer of a white reflective film is scraped off with a sharp-edged tool and collected by 0.05 g to extract a binder resin component by using organic solvent.
  (ii) The insoluble substance in the organic solvent is regarded as the spherical particles, whose weight A (g) is measured to calculate the content by the following expression.
  (iii) The above-mentioned (i) and (ii) are performed at five different spots to regard the average value of the five spots as 'content of spherical particles' in the example.

Content of spherical particles(% by weight)=weight $A$(g) of spherical particles/0.05 (g)×100

(2) Refractive Index of Binder Resin and Refractive Index of Spherical Particles
In the case of being unknown, the value of the refractive index of the binder resin and the spherical particles was calculated in the following manner.
  (i) The binder resin is extracted from the coating layer by using organic solvent, which is distilled off to thereafter measure refractive index for light with a wavelength of 589.3 nm at a temperature of 25° C. by an ellipsometry method. This is performed at five different spots to regard the average value of the five spots as 'refractive index of binder resin' in the example.
  (ii) The coating layer of the white reflective film is immersed in organic solvent, peeled and taken off the white film, and thereafter crimped and slid onto a slide glass to thereby drop off the spherical particles from the coating layer. It is confirmed that the outline of the spherical particles obtained disappears by Becke's line detecting method at a temperature of known refractive index of each liquid organic compound, and the refractive index of the liquid organic compound used is calculated. This is performed at five different spots to regard the average value of the five spots as 'refractive index of spherical particles' in the example.

(3) Volume Average Particle Diameter of Spherical Particles and Coefficient of Variation CV of Spherical Particles
The volume average particle diameter and coefficient of variation CV were measured at five different spots for the spherical particles which were collected in (1). A Coulter Multisizer III (manufactured by Beckman & Coulter Instruments, Inc.) as a particle-size distribution measuring apparatus utilizing a pore electric resistance method was used for measuring. The number and volume of the particles were measured by measuring electric resistance of electrolytic solution corresponding to the particle volume in the case where the particles passed through pores. First, a very small amount of sample was dispersed in diluted surfactant aqueous solution, which was subsequently added to a vessel of a specified electric resistance by the amount in which the aperture (pores of a detection part) passage rate reached 10 to 20% while watching the display of a monitor, and thereafter the particle diameter was continuously measured and automatically calculated until the number of passed particles reached a hundred thousand pieces to obtain volume average particle diameter, standard deviation of volume average particle diameter, and coefficient of variation CV. The value of coefficient of variation CV may be calculated by the following expression.

Coefficient of variation CV(%)=standard deviation of volume average particle diameter(μm)×100/volume average particle diameter(μm)

(4) Pore Aspect of Spherical Particles
A sample was cut in the direction perpendicular to a film plane at a knife tilt angle of 3° by using a rotary microtome manufactured by Nippon Microtome Laboratory. The obtained film cross section was observed by using a scanning electron microscope ABT-32 manufactured by Topcon Corp. so that one spherical particle was imaged substantially over the whole visual field by an observation magnification of 2500 to 10000 times or while properly adjusting the contrast of an image, and then the presence of pores was judged.

In the case where the spherical particles cannot be cut, the coating layer was immersed in an organic solvent, peeled and taken, and thereafter crimped and slid onto a slide glass to thereby drop off the spherical particles from the coating layer and take a sufficient amount of the spherical particles. Subsequently, the obtained spherical particles were observed by using a scanning electron microscope ABT-32 manufactured by Topcon Corp. so that one spherical particle was imaged substantially over the whole visual field by an observation magnification of 2500 to 10000 times while properly adjusting the contrast of an image, and then the presence of pores was judged.

The judgment of the presence of pores was performed by whether or not spots or a mottled pattern were observed in the particles in the observed image; the case where spots or a mottled pattern were observed or not observed was regarded as the presence of pores or the absence of pores, respectively.

(5) Yellowness (b Value)

The b value showing yellowness was measured by a reflection measuring method by C/2° light source with an SM color computer (manufactured by Suga Test Instruments Co., Ltd.). The b value was calculated for three samples to regard the average value thereof as yellowness.

(6) Light Resistance (Yellowness Change)

A forced ultraviolet irradiation test using an ultraviolet degradation accelerated tester EYE Super UV tester SUV-W131 (manufactured by Iwasaki Electric Co., Ltd.) was performed on with the following conditions to thereafter measure the b value. The test was performed for three samples to measure the b value before and after each test and then regard the average value of the difference as light resistance (yellowness variation).

'Ultraviolet Irradiation Conditions'
Illuminance: 100 mW/cm$^2$
Temperature: 60° C.
Relative humidity: 50% RH
Irradiation time: 48 hours Then, the result of evaluating light resistance was judged in accordance with the following to regard class A and class B as passed.
Class A: yellowness variation is less than 5
Class B: yellowness variation is 5 or more and less than 15
Class C: yellowness variation is 15 or more (7) Average Luminance The luminance was measured in an optical sheet constitution of the following two models by using a 21-inch direct type backlight (lamp pipe diameter: 3 mmΦ, number of lamps: 12 pipes, distance between lamps: 25 mm, distance between reflective film and lamp center: 4.5 mm, distance between diffuser plate and lamp center: 13.5 mm). In either case, the diffuser plate was placed so as to face the light source.

Model 1: diffuser plate RM803 (manufactured by Sumitomo Chemical Co., Ltd., a thickness of 2 mm)/two of diffuser sheets GM3 (manufactured by Kimoto Co., Ltd., a thickness of 100 μm)

Model 2: diffuser plate RM803 (manufactured by Sumitomo Chemical Co., Ltd., a thickness of 2 mm)/diffuser sheet GM3 (manufactured by Kimoto Co., Ltd., a thickness of 100 μm)/prism sheet BEF-II (manufactured by 3M Company, a thickness of 130 μm)/polarizing separation sheet DBEF (manufactured by 3M Company, a thickness of 400 μm)

With regard to luminance measurement, a cold cathode fluorescent lamp was lighted for 60 minutes to stabilize the light source and thereafter luminance (cd/m$^2$) was measured by using a calorimetric luminance meter BM-7fast (manufactured by Topcon Corp.). The average value was calculated for three samples and regarded as average luminance.

The difference (cd/m$^2$) between the average luminance and an average luminance of a white film provided with no coating layers were measured. The case where the value of luminance difference is positive indicates that the luminance is improved, while the case where the value of luminance difference is negative indicates that the luminance is deteriorated. The reflection property varies with kinds of a white film as a base material, and so the luminance difference was compared by the difference with the same kind of white film.

Example 1

10.0 g of "HALSHYBRID" (registered trademark) UV-G13 (an acrylic copolymer, solution of a concentration of 40%, a refractive index of 1.49, manufactured by Nippon Shokubai Co., Ltd.), 9.9 g of ethyl acetate, and 0.45 g of nonporous acrylic resin particles as spherical particles ("TECHPOLYMER" (registered trademark) SSX series, SSX-105, manufactured by Sekisui Plastics Co., Ltd., a refractive index of 1.49, a volume average particle diameter of 5.0 μm, a coefficient of variation CV of 9%, an acrylic copolymer, crosslink: present, ultraviolet absorbing agent: none, light stabilizer: none) were mixed and stirred to prepare a coating solution with the spherical particles added. This coating solution was coated on one side of a white film composed of a 250 μm porous biaxial oriented polyethylene terephthalate ("LUMIRROR" (registered trademark) E6SL, manufactured by Toray Industries Inc., three-layer structure, each of two surface layers containing calcium carbonate by 14% by weight with respect to the weight of each of the surface layers, the interlayer containing air bubbles) by using a bar coater No. 12 manufactured by Matsuo Sangyo Co., Ltd., and dried at a temperature of 120° C. for 1 minute to obtain a white film with a coated amount of 4.0 g/m$^2$.

Example 2

10.0 g of "HALSHYBRID" UV-G13 (an acrylic copolymer, solution of a concentration of 40%, a refractive index of 1.49, manufactured by Nippon Shokubai Co., Ltd.), 14.5 g of ethyl acetate, and 1.75 g of nonporous acrylic resin particles as spherical particles ("TECHPOLYMER" SSX series, SSX-105, manufactured by Sekisui Plastics Co., Ltd., a refractive index of 1.49, a volume average particle diameter of 5.0 μm, a coefficient of variation CV of 9%, an acrylic copolymer, crosslink: present, ultraviolet absorbing agent: none, light stabilizer: none) were mixed and stirred to prepare a coating solution with the spherical particles added. This coating solution was coated on one side of a white film composed of a 250 μm porous biaxial oriented polyethylene terephthalate ("LUMIRROR" E6SL, manufactured by Toray Industries Inc.) by using a bar coater No. 12 manufactured by Matsuo Sangyo Co., Ltd., and dried at a temperature of 120° C. for 1 minute to obtain a white film with a coated amount of 4.0 g/m$^2$.

Example 3

A white film with a coated amount of 4.0 g/m$^2$ was obtained in the same manner as Example 2 except for replacing the white film with a white film composed of a 250 μm porous biaxial oriented polyethylene terephthalate ("LUMIRROR" E6SQ, manufactured by Toray Industries Inc., three-layer structure, each of two surface layers containing silicon dioxide by 0.0004% by weight with respect to the weight of each of the surface layers, the interlayer containing air bubbles).

Example 4

10.0 g of "HALSHYBRID" UV-G13 (an acrylic copolymer, solution of a concentration of 40%, a refractive index of 1.49, manufactured by Nippon Shokubai Co., Ltd.), 26.1 g of ethyl acetate, and 4.05 g of nonporous acrylic resin particles as spherical particles ("TECHPOLYMER" SSX series, SSX- 105, manufactured by Sekisui Plastics Co., Ltd., a refractive index of 1.49, a volume average particle diameter of 5.0 μm, a coefficient of variation CV of 9%, an acrylic copolymer, crosslink: present, ultraviolet absorbing agent: none, light stabilizer: none) were mixed and stirred to prepare a coating solution with the spherical particles added. This coating solution was coated on one side of a white film composed of a 250 μm porous biaxial oriented polyethylene terephthalate ("LUMIRROR" E6SL, manufactured by Toray Industries Inc.) by using a bar coater No. 12 manufactured by Matsuo Sangyo Co., Ltd. to obtain a white film with a coated amount of 4.0 g/m$^2$.

Example 5

A white film with a coated amount of 4.0 g/m$^2$ was obtained in the same manner as Example 2 except for replacing the spherical particles with nonporous acrylic resin particles ("TECHPOLYMER" SSX-102, manufactured by Sekisui Plastics Co., Ltd., a refractive index of 1.49, a volume average particle diameter of 2.5 μm, a coefficient of variation CV of 10%, an acrylic copolymer, crosslink: present, ultraviolet absorbing agent: none, light stabilizer: none).

Example 6

A white film with a coated amount of 4.0 g/m$^2$ was obtained in the same manner as Example 2 except for replacing the spherical particles with nonporous acrylic resin particles ("TECHPOLYMER" MBX series, XX-09FP, manufactured by Sekisui Plastics Co., Ltd., a refractive index of 1.49, a volume average particle diameter of 5.0 μm, a coefficient of variation CV of 27%, an acrylic copolymer, crosslink: present, ultraviolet absorbing agent: none, light stabilizer: none).

Example 7

A white film with a coated amount of 4.0 g/m$^2$ was obtained in the same manner as Example 2 except for replacing the spherical particles with nonporous acrylic resin particles ("TECHPOLYMER" MBX series, MB30X-8, manufactured by Sekisui Plastics Co., Ltd., a refractive index of 1.49, a volume average particle diameter of 8.0 μm, a coefficient of variation CV of 32%, an acrylic copolymer, crosslink: present, ultraviolet absorbing agent: none, light stabilizer: none).

Example 8

'Producing Method for Spherical Particles A'

70 parts by weight of methyl methacrylate, 10 parts by weight of trimethylolpropane triacrylate as a polyfunctional monomer for forming a crosslinked structure, 3 parts by weight of 2,2,6,6-tetramethyl-4-piperidyl methacrylate as a hindered amine polymerizable compound, 10 parts by weight of 2-(2'-hydroxy-5'-methacryloxyethylphenyl)-2H-benzotriazole as a benzotriazole polymerizable compound, and 1 part by weight of lauroyl peroxide as a polymerization initiator were put into a four-necked flask with a capacity of 1 liter equipped with a stirring apparatus, a thermometer and a nitrogen gas inlet tube. Then, 1 part by weight of polyvinyl alcohol (PVA-224, manufactured by Kuraray Co., Ltd.) as a dispersion stabilizer for this solution and 200 parts by weight of water were added thereto. This mixture was stirred by using a homomixer at the number of revolutions of 9000 rpm for 3 minutes to disperse the polymerizable compound into water. Subsequently, this dispersion was heated to a temperature of 75° C. and reacted for 2 hours while being maintained at this temperature, and further heated to a temperature of 90° C. and subjected to copolymerization reaction for 3 hours.

After being reacted as described above, the dispersion was cooled to room temperature and filtered by using a mesh filter with an aperture of 40 μm to remove the agglomerate and the like. The agglomerate did not exist in the obtained dispersion, whose filterability was very favorable.

The volume average particle diameter of the resin particles dispersed into the dispersion filtered was 6.4 μm, and these resin particles were genuinely spherical.

The dispersion of the resin particles obtained was washed in accordance with an ordinary method, thereafter filtered and separated into the resin particles and dispersion medium, and the separated resin particles were dried and subsequently classified to obtain spherical particles A (a coefficient of variation CV of 15%).

'Producing Method for White Reflective Film'

10.0 g of "HALSHYBRID" UV-G13 (an acrylic copolymer, solution of a concentration of 40%, a refractive index of 1.49, manufactured by Nippon Shokubai Co., Ltd.), 11.9 g of ethyl acetate, and 1.0 g of the spherical particles A (a refractive index of 1.49, a volume average particle diameter of 6.4 μm, a coefficient of variation CV of 15%, an acrylic copolymer, crosslink: present, ultraviolet absorbing agent: benzotriazole, light stabilizer: hindered amine) were mixed and stirred to prepare a coating solution with the spherical particles added. This coating solution was coated on one side of a white film composed of a 250 μm porous biaxial oriented polyethylene terephthalate ("LUMIRROR" E6SL, manufactured by Toray Industries Inc.) by using a bar coater No. 12 manufactured by Matsuo Sangyo Co., Ltd., and dried at a temperature of 120° C. for 1 minute to obtain a white film with a coated amount of 4.0 g/m$^2$.

Example 9

A white film with a coated amount of 4.0 g/m$^2$ was obtained in the same manner as Example 8 except for replacing the spherical particles with nonporous silicon oxide (silica) particles ("QUARTRON" (registered trademark) SP series, SP-3C, manufactured by Fuso Chemical Co., Ltd., a refractive index of 1.45, a volume average particle diameter of 3.0 μm, a coefficient of variation CV of 16%, crosslink: present, ultraviolet absorbing agent: none, light stabilizer: none).

Example 10

A white film with a coated amount of 4.0 g/m$^2$ was obtained in the same manner as Example 8 except for replacing the spherical particles with nonporous silicone particles ("TOSPEARL" (registered trademark) TOSPEARL 145, manufactured by GE Toshiba Silicone Co., Ltd., a refractive index of 1.42, an average particle diameter of 4.5 μm, a coefficient of variation CV of 12%, crosslink: present, ultraviolet absorbing agent/light stabilizer: none).

Example 11

A white film with a coated amount of 4.0 g/m$^2$ was obtained in the same manner as Example 8 except for replacing the spherical particles with nonporous polystyrene particles ("TECHPOLYMER" SBX series, SBX-8, manufactured by Sekisui Plastics Co., Ltd., a refractive index of 1.59, an average particle diameter of 8.0 μm, a coefficient of variation CV of 37%, a styrene copolymer, crosslink: present, ultraviolet absorbing agent/light stabilizer: none).

Example 12

A white film with a coated amount of 4.0 g/m² was obtained in the same manner as Example 2 except for replacing the spherical particles with nonporous acrylic resin particles ("TECHPOLYMER" MBX-8, manufactured by Sekisui Plastics Co., Ltd., a refractive index of 1.49, a volume average particle diameter of 8.0 μm, a coefficient of variation CV of 44%, an acrylic copolymer, crosslink: present, ultraviolet absorbing agent: none, light stabilizer: none).

Comparative Example 1

A white film composed of a 250 μm porous biaxial oriented polyethylene terephthalate ("LUMIRROR" E6SL, manufactured by Toray Industries Inc.) was not provided with the coating layer, and subjected to light resistance evaluation and luminance measurement.

Comparative Example 2

A white film composed of a 250 μm porous biaxial oriented polyethylene terephthalate ("LUMIRROR" E6SQ, manufactured by Toray Industries Inc.) was not provided with the coating layer, and subjected to light resistance evaluation and luminance measurement.

Comparative Example 3

10.0 g of "HALSHYBRID" UV-G13 (an acrylic copolymer, solution of a concentration of 40%, a refractive index of 1.49, manufactured by Nippon Shokubai Co., Ltd.) and 18.9 g of toluene were mixed and stirred to prepare a coating solution. This coating solution was coated on one side of a white film composed of a 250 μm porous biaxial oriented polyethylene terephthalate ("LUMIRROR" E6SL, manufactured by Toray Industries Inc.) by using a bar coater No. 12 manufactured by Matsuo Sangyo Co., Ltd., and dried at a temperature of 120° C. for 1 minute to obtain a white film with a coated amount of 4.0 g/m² in only the binder resin.

Comparative Example 4

A white film with a coated amount of 4.0 g/m² was obtained in the same manner as Example 8 except for replacing the spherical particles with nonporous benzoguanamine formaldehyde condensate particles ("EPOSTAR" (registered trademark) EPOSTAR M05, manufactured by Nippon Shokubai Co., Ltd., a refractive index of 1.66, a volume average particle diameter of 5.2 μm, a coefficient of variation CV of 35%, polyamide resin particles, crosslink: present, ultraviolet absorbing agent: none, light stabilizer: none).

Comparative Example 5

A white film with a coated amount of 4.0 g/m² was obtained in the same manner as Example 2 except for replacing the spherical particles with nonporous acrylic resin particles ("TECHPOLYMER" MBP series, MBP-8, manufactured by Sekisui Plastics Co., Ltd., a refractive index of 1.49, a volume average particle diameter of 8.0 μm, a coefficient of variation CV of 44%, an acrylic copolymer, crosslink: present, ultraviolet absorbing agent: none, light stabilizer: none).

The results of evaluating in Examples and Comparative Examples are shown in Table 1.

Comparative Example 6

Nonporous acrylic resin particles ("TECHPOLYMER" MBP series, MBP-8, manufactured by Sekisui Plastics Co., Ltd., a refractive index of 1.49, a volume average particle diameter of 8.0 μm, a coefficient of variation CV of 44%, an acrylic copolymer, crosslink: present, ultraviolet absorbing agent: none, light stabilizer: none) were classified by using a micropowder precision classifier KFSH-150 (manufactured by Aishin Nano Technologies Co., Ltd.). A white film with a coated amount of 4.0 g/m² was obtained in the same manner as Example 3 by using the obtained spherical particles (a refractive index of 1.49, a volume average particle diameter of 5.0 μm, a coefficient of variation CV of 9%, an acrylic copolymer, crosslink: present, ultraviolet absorbing agent: none, light stabilizer: none).

TABLE 1

| | Kinds of spherical Particles | Kinds of white films | Shapes of spherical particles | Refractive index difference between spherical particles and binder resin (absolute value) | Pores of spherical particles | Co-efficient of variation of spherical particles [%] | Volume average particle diameter of spherical particles [μm] | Content of spherical particles in coating layer [% by weight] | Light resistance | Luminance [cd/m²] Model 1 Average luminance | Model 1 Luminance difference | Model 2 Average luminance | Model 2 Luminance difference |
|---|---|---|---|---|---|---|---|---|---|---|---|---|---|
| Example 1 | Acrylic | A | Spherical shape | 0.00 | Nonporous | 9 | 5.0 | 10 | A | 6820 | 20 | 4510 | 10 |
| Example 2 | Acrylic | A | Spherical shape | 0.00 | Nonporous | 9 | 5.0 | 30 | A | 6870 | 70 | 4550 | 50 |
| Example 3 | Acrylic | B | Spherical shape | 0.00 | Nonporous | 9 | 5.0 | 30 | A | 7020 | 100 | 4710 | 70 |
| Example 4 | Acrylic | A | Spherical shape | 0.00 | Nonporous | 9 | 5.0 | 50 | A | 6850 | 50 | 4540 | 40 |
| Example 5 | Acrylic | A | Spherical shape | 0.00 | Nonporous | 10 | 2.5 | 30 | A | 6860 | 60 | 4540 | 40 |
| Example 6 | Acrylic | A | Spherical shape | 0.00 | Nonporous | 27 | 5.0 | 30 | A | 6830 | 30 | 4520 | 20 |

TABLE 1-continued

| | Kinds of spherical Particles | Kinds of white films | Shapes of spherical particles | Refractive index difference between spherical particles and binder resin (absolute value) | Pores of spherical particles | Coefficient of variation of spherical particles [%] | Volume average particle diameter of spherical particles [μm] | Content of spherical particles in coating layer [% by weight] | Light resistance | Luminance [cd/m²] | | | |
|---|---|---|---|---|---|---|---|---|---|---|---|---|---|
| | | | | | | | | | | Model 1 | | Model 2 | |
| | | | | | | | | | | Average luminance | Luminance difference | Average luminance | Luminance difference |
| Example 7 | Acrylic | A | Spherical shape | 0.00 | Nonporous | 32 | 8.0 | 30 | A | 6810 | 10 | 4505 | 5 |
| Example 8 | Spherical particles A | A | Spherical shape | 0.00 | Nonporous | 15 | 6.4 | 20 | A | 6860 | 60 | 4540 | 40 |
| Example 9 | Silicon oxide | A | Spherical shape | 0.04 | Nonporous | 16 | 3.0 | 20 | A | 6840 | 40 | 4530 | 30 |
| Example 10 | Silicone | A | Spherical shape | 0.07 | Nonporous | 12 | 4.5 | 20 | B | 6830 | 30 | 4520 | 20 |
| Example 11 | Polystyrene | A | Spherical shape | 0.10 | Nonporous | 37 | 8.0 | 20 | B | 6810 | 10 | 4510 | 10 |
| Example 12 | Acrylic | A | Spherical shape | 0.00 | Nonporous | 44 | 8.0 | 30 | A | 6825 | 25 | 4515 | 15 |
| Comparative Example 1 | — | A | — | — | — | — | — | — | C | 6800 | 0 | 4500 | 0 |
| Comparative Example 2 | — | B | — | — | — | — | — | — | C | 6920 | 0 | 4640 | 0 |
| Comparative Example 3 | — | A | — | — | — | — | — | — | A | 6790 | −10 | 4500 | 0 |
| Comparative Example 4 | Benzoguanamine formaldehyde condensate particles | A | Spherical shape | 0.17 | Nonporous | 37 | 5.2 | 20 | C | 6780 | −20 | 4470 | −30 |
| Comparative Example 5 | Acrylic | A | Spherical shape | 0.00 | Porous | 44 | 8.0 | 30 | B | 6810 | 10 | 4505 | 5 |
| Comparative Example 6 | Acrylic | B | Spherical shape | 0.00 | Porous | 9 | 5.0 | 30 | B | 6925 | 5 | 4645 | 5 |

Kinds of white A: "LUMIRROR" E6SL, manufactured by Toray Industries Inc. B: "LUMIRROR" E6SQ, manufactured by Toray Industries Inc.

In any of Examples 1 to 12, the effect of improving luminance (that is, the effect of improving reflectance of the white reflective film itself) was observed with respect to the same kind of white films provided with no coating layers. On the other hand, in the case of being provided with no coating layers, light resistance was rejected (Comparative Examples 1 and 2). In the case where no spherical particles were added even if provided with the coating layer or the case where the refractive index difference between the binder resin and the spherical particles was larger than 0.10, no improvement in luminance was observed (Comparative Examples 3 and 4). In addition, even if the refractive index difference of the spherical particles in the coating layer was 0.10 or less, it is found that the cases of Comparative Examples 5 and 6 as porous examples are inferior in light resistance and low in the effect of improving luminance with respect to Examples 12 and 3 on the same conditions except for being nonporous.

Among Examples, in comparison of Examples 8 through 11, it is found that smaller refractive index difference between the binder resin and the spherical particles improves luminance. In comparison of Examples 2, 6 and 7, it is further found that smaller coefficient of variation of the spherical particles improves luminance. In comparison of Examples 1, 2 and 4, it is found that luminance varies with the content of the spherical particles in the coating layer even if the refractive index difference and the coefficient of variation are the same. In comparison of Examples 5 and 6, it is found that luminance varies with the volume average particle diameter of the spherical particles even if the refractive index difference is the same. When a similar coating layer was provided on a white film such that the added particle amount to the surface layer was determined in a certain range, luminance was further improved (Example 3). In addition, even if the refractive index difference between the binder resin and the spherical particles is 0.10 or less, it is found that a coefficient of variation of more than 30 decreases an improvement in luminance (Example 7). Then, in the case of using silicone or polystyrene easily yellowed due to ultraviolet rays, an improvement in luminance was observed but consequently light resistance was somewhat low (Examples 10 and 11).

The invention claimed is:
1. A white reflective film having a coating layer containing spherical particles on at least one side of a white film, in which an absolute value of refractive index difference between the spherical particles and a binder resin forming the coating layer is 0.10 or less, and the spherical particles are nonporous.
2. The white reflective film according to claim 1, in which a coefficient of variation CV of the spherical particles is 30% or less.
3. The white reflective film according to claim 1, in which the spherical particles contain an ultraviolet absorbing agent and/or a light stabilizer.
4. The white reflective film according to claim 3, in which the spherical particles are copolymerized with the ultraviolet absorbing agent and/or the light stabilizer.
5. The white reflective film according to claim 1, in which a resin composing the spherical particles contains the same monomer component as the binder resin forming the coating layer.

6. The white reflective film according to claim 1, in which the white film is composed of three layers, an interlayer is a layer containing air bubbles, at least one of two surface layers is a layer such that inorganic particles and/or organic particles are contained in polyester, and the surface layers containing the inorganic particles and/or the organic particles contain the inorganic particles and/or the organic particles in a range of 0.5% by weight or less with respect to weight of the layers.

7. An edge light type liquid crystal backlight in which the white reflective film according to claim 1 is provided with a coating layer side thereof faced to a light source side.

8. A direct type liquid crystal backlight in which the white reflective film according to claim 1 is provided with a coating layer side thereof faced to a light source side.

* * * * *